United States Patent
Freienmuth et al.

(10) Patent No.: US 12,161,062 B2
(45) Date of Patent: Dec. 10, 2024

(54) MULTIPLE HIRTH JOINT FOR LAWN MOWER CONTROLS

(71) Applicant: Ariens Company, Brillion, WI (US)

(72) Inventors: Eric Otto Freienmuth, Appleton, WI (US); Ross Michael Seefeldt, Manitowoc, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 18/685,659

(22) PCT Filed: Aug. 22, 2022

(86) PCT No.: PCT/US2022/075274
§ 371 (c)(1),
(2) Date: Feb. 22, 2024

(87) PCT Pub. No.: WO2023/028453
PCT Pub. Date: Feb. 3, 2023

(65) Prior Publication Data
US 2024/0324500 A1   Oct. 3, 2024

Related U.S. Application Data

(60) Provisional application No. 63/236,093, filed on Aug. 23, 2021.

(51) Int. Cl.
*A01D 34/82* (2006.01)
*B62D 1/12* (2006.01)
(Continued)

(52) U.S. Cl.
CPC ............ *A01D 34/824* (2013.01); *B62D 1/12* (2013.01); *G05G 1/06* (2013.01); *A01D 2101/00* (2013.01); *G05G 2700/02* (2013.01)

(58) Field of Classification Search
CPC .... A01D 34/824; A01D 2101/00; B62D 1/12; G05G 1/06; G05G 2700/02
See application file for complete search history.

(56) References Cited

U.S. PATENT DOCUMENTS 6,098,492 A * 8/2000 Juchniewicz ............. B62B 9/20
74/555
8,087,481 B2   1/2012 Trefz et al.
(Continued)

FOREIGN PATENT DOCUMENTS

CN     207252233 U    4/2018
FR     1191504 A     10/1959
(Continued)

OTHER PUBLICATIONS

Cub Cadet, "Ultima ZTX4 54 in. Fabricated Deck 24 HP V-Twin Kohler 7000 Pro Series Engine Zero Turn Mower with Roll Over Protection," <https://www.homedepot.com/p/Cub-Cadet-Ultima-ZTX4-54-in-Fabricated-Deck-24-HP-V-Twin-Kohler-7000-Pro-Series-Engine-Zero-Turn-Mower-with-Roll-Over-Protection-ULTIMA-ZTX4-54/311632997?MERCH=REC-_-pipsem-_-314730677-_-311632997-_-N&> web page available at least as early as Jun. 10, 2021 (5 pages).
(Continued)

*Primary Examiner* — Toan C To
(74) *Attorney, Agent, or Firm* — Michael Best & Friedrich LLP

(57) ABSTRACT

A multiple Hirth joint for permitting linear and angular adjustment of an upper control arm with respect to a lower control arm. The joint includes a multiple Hirth interface having a slot through it, a confronting single Hirth interface, and an actuator. The actuator permits manual loosening and tightening of the multiple Hirth interface and single Hirth interface to permit linear and angular adjustment. Loosening of the actuator simultaneously permits linear and angular (Continued)

adjustment and tightening of the actuator simultaneously lock the joint into the selected linear and angular position.

21 Claims, 8 Drawing Sheets

(51) Int. Cl.
*G05G 1/06* (2006.01)
*A01D 101/00* (2006.01)

(56) References Cited

U.S. PATENT DOCUMENTS

| | | | |
|---|---|---|---|
| 8,186,475 B2 | 5/2012 | Sugden et al. | |
| 8,984,718 B2* | 3/2015 | Ejdehag | F16C 11/10 16/436 |
| 9,808,929 B2* | 11/2017 | Bukovitz | B25H 1/0035 |
| 10,321,627 B1* | 6/2019 | Lapp | G05G 1/04 |
| 2005/0227824 A1* | 10/2005 | Wu | A63B 22/0664 482/52 |
| 2014/0112702 A1* | 4/2014 | Mighells | F16C 11/10 403/92 |
| 2019/0183044 A1 | 6/2019 | Lapp | |

FOREIGN PATENT DOCUMENTS

| | | |
|---|---|---|
| FR | 2736032 A1 | 1/1997 |
| WO | 2014080166 A1 | 5/2014 |
| WO | 2021113306 A1 | 6/2021 |

OTHER PUBLICATIONS

International Search Report and Written Opinion for Application No. PCT/US2022/075274 dated Nov. 21, 2022 (16 pages).
International Preliminary Report on Patentability for Application No. PCT/US2022/075274 dated Mar. 4, 2024 (22 pages).

* cited by examiner

MULTIPLE HIRTH JOINT FOR LAWN MOWER CONTROLS

CROSS-REFERENCE TO RELATED APPLICATIONS

This application claims priority to U.S. Provisional Patent Application No. 63/236,093 filed on Aug. 23, 2021, the entire contents of which are incorporated herein by reference.

BACKGROUND

The present invention relates to a multiple Hirth joint for lawn mower controls which enables the controls to be adjusted linearly and angularly in a single joint.

SUMMARY

In one aspect, the invention provides a utility vehicle comprising: a frame; an operator zone for an operator of the lawn mower during operation; a control handle including a lower arm and an upper arm; and an adjustable joint between the lower arm and upper arm, the adjustable joint including a first component having a multiple Hirth joint interface and a slot, a second component having a single Hirth joint interface, and an actuator; wherein the actuator is manually adjustable to simultaneously loosen the adjustable joint to permit relative linear movement along the slot between the first and second components and relative angular movement between the first and second components, such relative linear and angular movement adjusting the upper arm into a selected position with respect to the lower arm to accommodate a size of the operator, and wherein the actuator is manually adjustable to simultaneously tighten the adjustable joint to lock the upper arm in the selected position with respect to the lower arm.

In some embodiments, the multiple Hirth joint interface includes lower, middle, and upper sets of face teeth that mesh with face teeth on the single Hirth joint interface. In some embodiments, the slot extends diametrically across the middle set of face teeth and includes an upper end centered in the upper set of face teeth, a lower end centered in the lower set of face teeth, and a middle portion centered in the middle face teeth. In some embodiments, a first distance is defined between the middle portion and the upper end of the slot and a second distance is defined between the middle portion and the lower end of the slot, wherein the first and second distances define a linear range of the upper arm, and wherein the single Hirth joint interface has a diameter that is larger than the first distance and the second distance. In some embodiments, the diameter is in a range from 1.25 to 2 times the first distance or the second distance. In some embodiments, the actuator includes a fastener movable along the slot, loosening the adjustable joint includes moving the first and second components away from each other along the fastener, and tightening the adjustable joint includes moving the first and second components toward each other along the fastener. In some embodiments, the second component includes a first housing portion and a second housing portion removably coupled to the upper arm. In some embodiments, a first through-hole is formed in the second component and is centered in the single Hirth interface, and wherein a first aperture is formed in the upper arm and is configured to be aligned with the first through-hole to receive the actuator. In some embodiments, a second through-hole is formed in the second component vertically offset the first through-hole, wherein a second aperture is formed in the upper arm vertically offset the first aperture, and wherein an alignment fastener is configured to extend through the second through-hole and the second aperture to secure the second component to the upper arm. In some embodiments, a second aperture is oversized so the upper arm can be adjusted relative to the second component in the fore and aft direction.

In another aspect, the invention provides a control handle for a utility vehicle, the control handle comprising: a lower arm, an upper arm, and an adjustable joint between the lower arm and upper arm, the adjustable joint including a first component having a multiple Hirth joint interface and a slot, a second component having a single Hirth joint interface, and an actuator configured to be manually adjustable to simultaneously loosen the adjustable joint to permit relative linear movement along the slot between the first and second components and relative angular movement between the first and second components, such relative linear and angular movement adjusting the upper arm into a selected position with respect to the lower arm to accommodate a size of the operator; wherein the actuator is configured to be manually adjustable to simultaneously tighten the adjustable joint to lock the upper arm in the selected position with respect to the lower arm.

In some embodiments, the multiple Hirth joint interface includes lower, middle, and upper sets of face teeth that mesh with face teeth on the single Hirth joint interface. In some embodiments, the slot extends diametrically across the middle set of face teeth and includes an upper end centered in the upper set of face teeth, a lower end centered in the lower set of face teeth, and a middle portion centered in the middle face teeth. In some embodiments, the actuator includes a fastener movable along the slot, loosening the adjustable joint includes moving the first and second components away from each other along the fastener, and tightening the adjustable joint includes moving the first and second components toward each other along the fastener. In some embodiments, the second component includes a first housing portion and a second housing portion removably coupled to the upper arm. In some embodiments, a first through-hole is formed in the second component and is centered in the single Hirth interface, and wherein a first aperture is formed in the upper arm and is configured to be aligned with the first through-hole to receive the actuator. In some embodiments, a second through-hole is formed in the second component vertically offset the first through-hole, wherein a second aperture is formed in the upper arm offset the first aperture, and wherein an alignment fastener is configured to extend through the second through-hole and the second aperture to secure the second component to the upper arm. In some embodiments, a second aperture is elongated in a fore and aft direction so the upper arm can be adjusted relative to the second component in the fore and aft direction.

In another aspect, the invention provides a utility vehicle comprising: a frame; an operator zone for an operator of the lawn mower during operation; a control handle including a lower arm and an upper arm; and an adjustable joint between the lower arm and upper arm, the adjustable joint including a first component having a first Hirth joint interface, a second Hirth joint interface, and a slot extending from a first Hirth joint center to a second Hirth joint center, wherein the first Hirth joint center and the second Hirth joint center are separated by a first distance, a second component having a single Hirth joint interface, the single Hirth joint having a diameter, and an actuator configured to selectively permit or lock relative linear movement along the slot between the first and second components and relative angular movement between the first and second components, wherein the diameter of the single Hirth joint is greater than the first distance between the first Hirth joint center and the second Hirth joint center.

In some embodiments, the first component includes a third Hirth joint interface having a third Hirth joint center, wherein the second Hirth joint interface is positioned between the first and third Hirth joint interfaces, and wherein the third Hirth joint center and the second Hirth joint center are separated by a second distance that is equal to the first distance, and wherein the first, second, and third Hirth joint interfaces each include face teeth that mesh with face teeth on the single Hirth joint interface. In some embodiments, the actuator includes a fastener movable along the slot, loosening the adjustable joint includes moving the first and second components away from each other along the fastener, and tightening the adjustable joint includes moving the first and second components toward each other along the fastener. Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
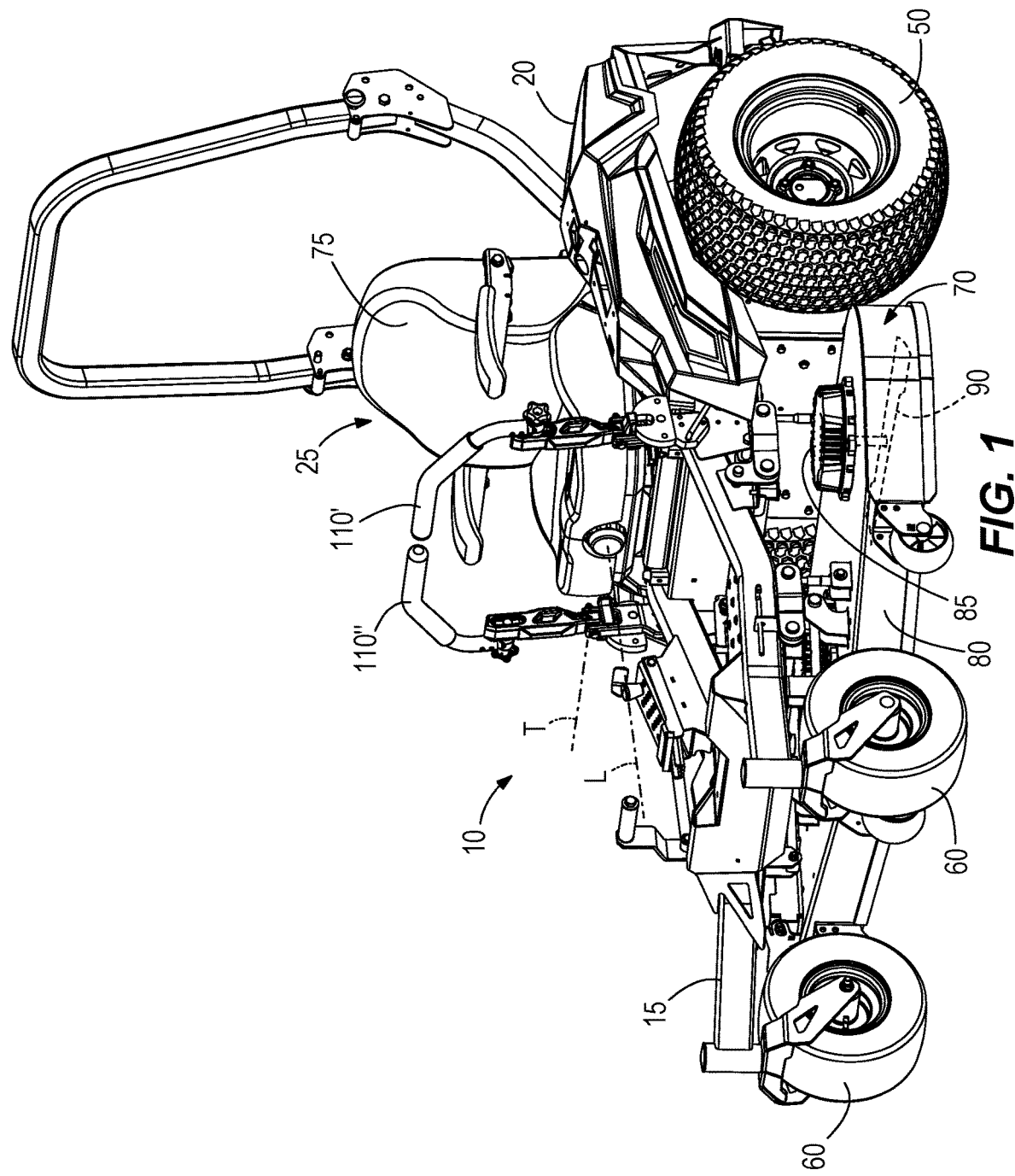
FIG. 1 is a perspective view of a lawn mower including a multiple Hirth joint according to the present invention.

FIG. 1 illustrates a utility vehicle (e.g., a lawn mower) 10 including a frame 15, a power source 20, an operator zone 25, drive wheels 50, casters 60, and a mower deck assembly 70. The power source 20 is a bank of batteries in a rear storage compartment supported by the frame 15. The operator zone 25 is supported by the frame 15 forward of the power source 20 and includes a seat 75 for the operator and all controls within reach of the operator while seated on the seat 75. The operator zone 25 includes a left control arm 110' and a right control arm 110" which will be discussed in more detail below. The drive wheels 50 support a rear portion of the frame 15 and are rotated by drive motors under power from the power source 20 and at a speed and direction dictated by position of the control arms 110', 110". The casters 60 are passive wheels that swivel about vertical axes. The mower deck assembly 70 is suspended from the frame 15 and includes a mower deck 80, multiple deck motors 85 and blades 90 under the mower deck 80. The deck motors 85 drive rotation of the blades 90 beneath the mower deck 80 under power from the power source 20. While the depicted utility vehicle is a lawn mower, it should be appreciated that the present invention is applicable to any utility vehicle including any kind of implement (e.g., a mower deck, plow, etc.) that performs work in addition to moving the utility machine (e.g., driving rotation of wheels or track drives).

Other than a unique adjustable joint in the control arms 110', 110", the lawn mower 10 is of a type well known in the art and referred to as a zero turn radius mower. The terms left, right, forward, rearward, up and down and all other directional terms will be made from the point of view of an operator seated in the operator zone 25. The lawn mower 10 includes a longitudinal axis "L" extending forward and rearward and a transverse axis "T" extending left and right perpendicular to the longitudinal axis L. A component is said to pivot left and right, sideways, outboard and inboard, or similar if it pivots about an axis that is parallel to the longitudinal axis L. A component is said to pivot forward and back, fore and aft, or similar if it pivots about an axis that is parallel to the transverse axis T. The term "outboard" indicates a direction parallel to the transverse axis T and away from the operator zone 25 (i.e., left and right away from the mower 10) and the term "inboard" indicates an opposite direction (i.e. toward the operator zone 25 from one of the sides).

Figure 2:
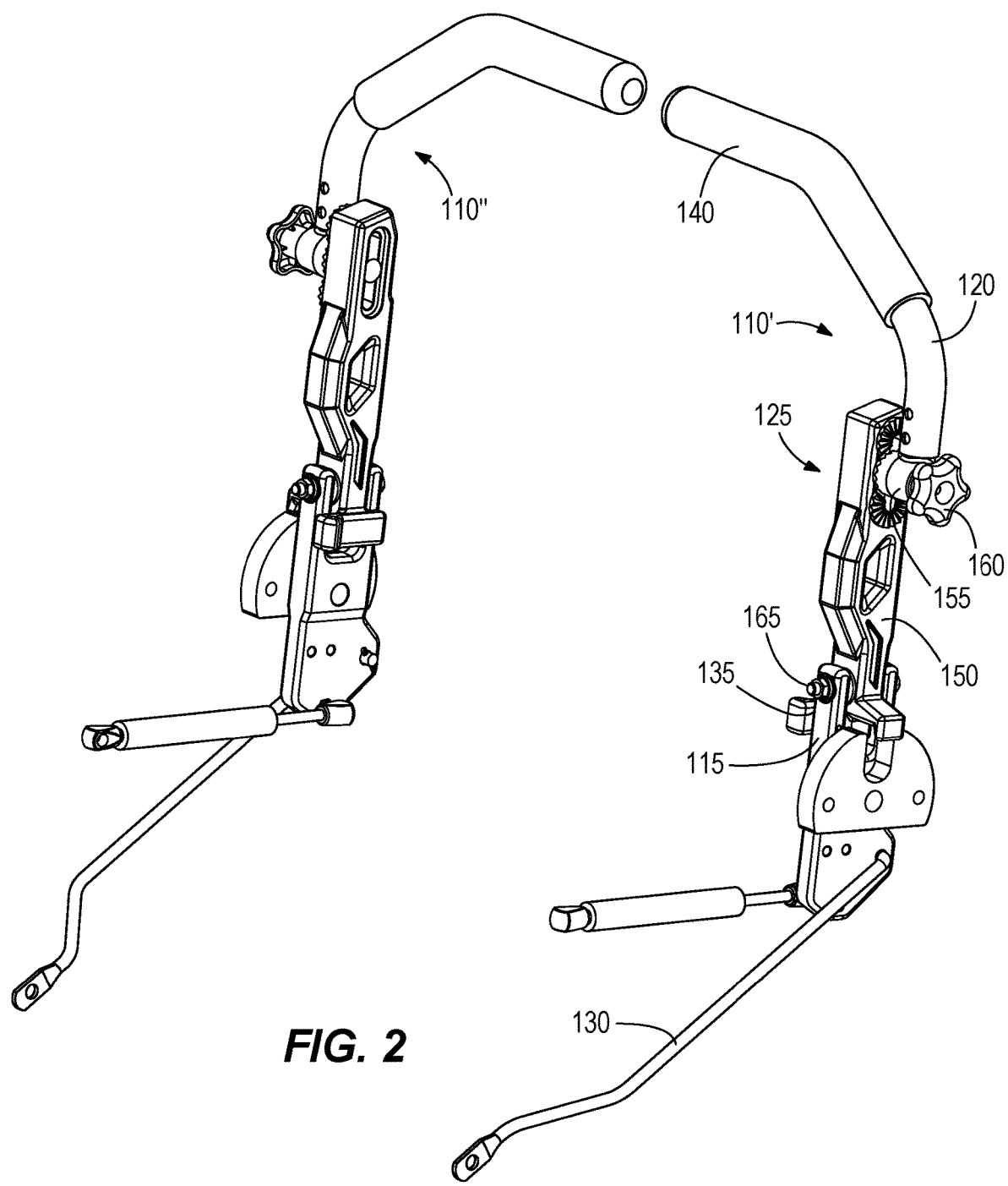
FIG. 2 is a perspective view of two control arms of the lawn mower, each including the multiple Hirth joint.

Turning to FIG. 2, the left and right control arms 110', 110" are mirror images of each other and will be described together with reference to a control arm 110 unless there is a need to distinguish them from each other. The control arm 110 includes a lower arm 115, upper arm 120, and an adjustable joint 125 connecting the lower arm 115 and upper arm 120. The lower arm 115 pivots fore and aft and includes a linkage 130 to an associated drive motor that operates an associated drive wheel 50. The upper end of the lower arm 115 includes a yoke 135. The upper arm 120 includes a grip 140 that is grasped by the operator to manipulate the control arm 110.

Figure 3:
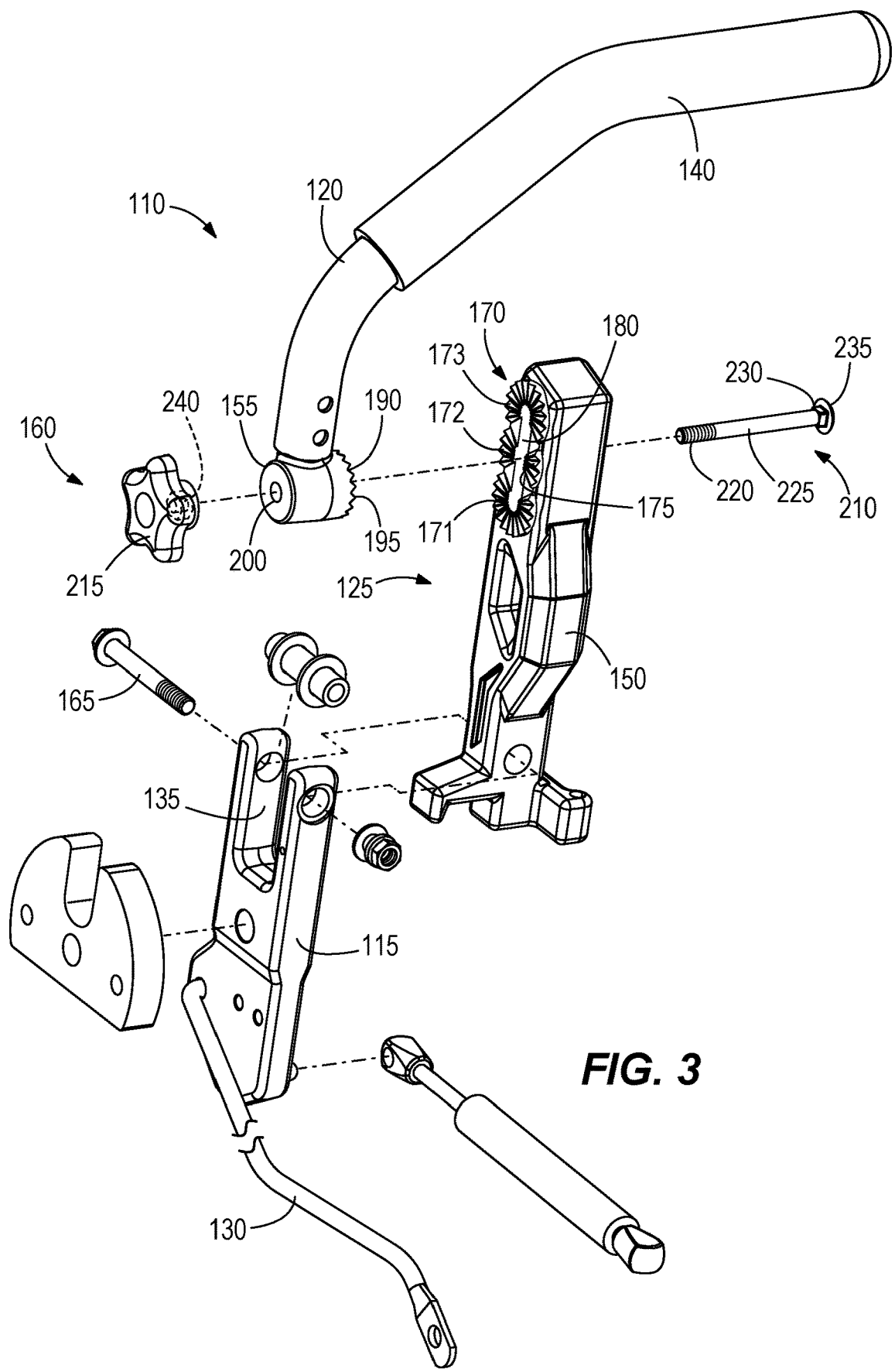
FIG. 3 is an exploded view of one of the control arms.
Figure 4:
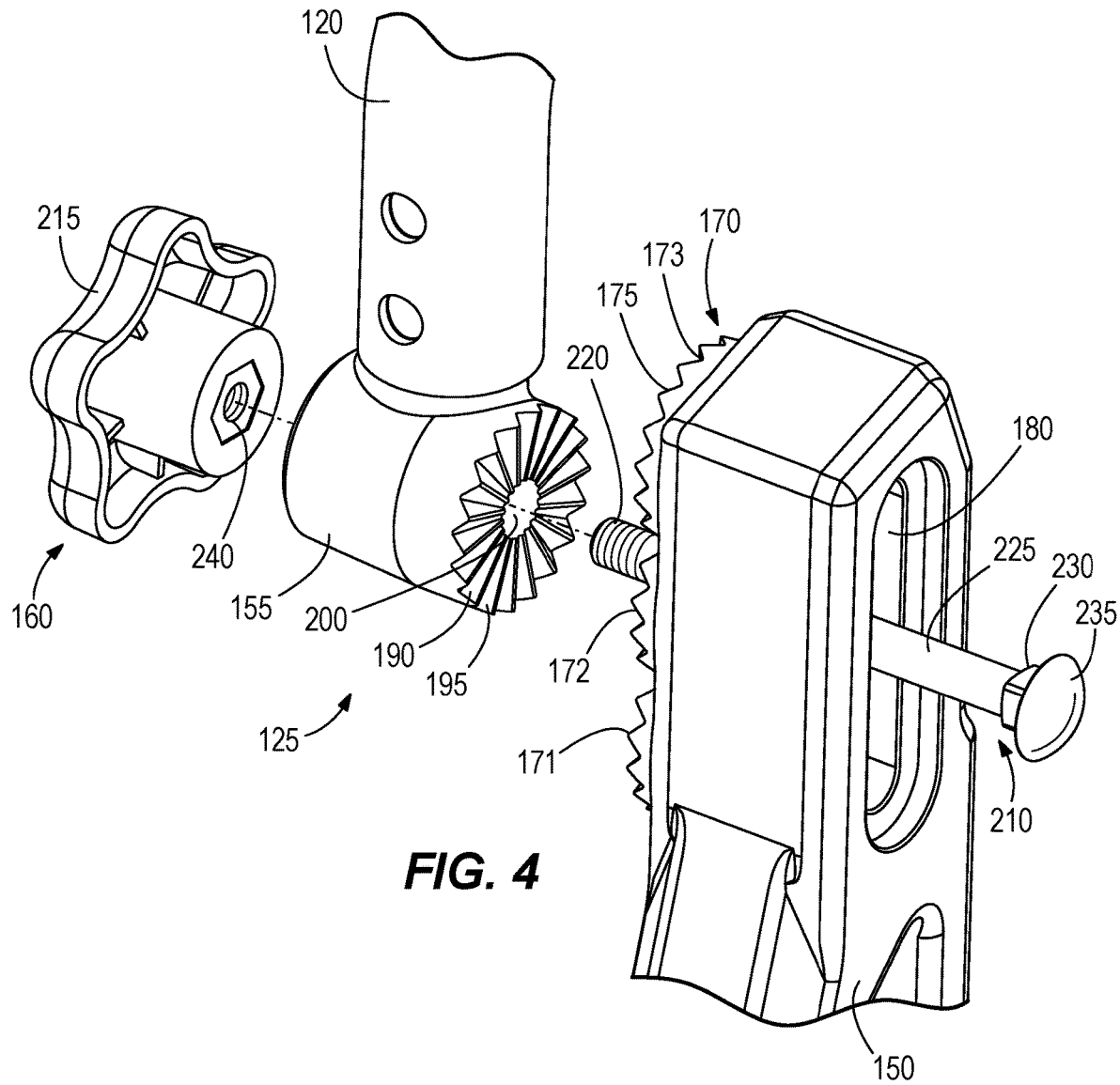
FIG. 4 is an exploded view of the multiple Hirth joint.

Referring now to FIGS. 3 and 4, the adjustable joint 125 includes a first component 150, a second component 155, and an actuator 160. The first component 150, which may also be called a main body, is pivotably mounted at its lower end to yoke 135 of the lower arm 115 with a pivot pin 165 for pivoting outboard to provide operator ingress and egress with respect to the operator zone 25 and inboard for operation of the mower 10 with the operator in the operator zone 25. The first component 150 also includes a multiple Hirth interface 170 which includes a lower Hirth interface 171, a middle Hirth interface 172, and an upper Hirth interface 173. Each of the lower, middle, and upper Hirth interfaces 171, 172, 173 includes face teeth 175 arranged in a partial circular pattern. The multiple Hirth interface 170 also includes a slot 180 extending diametrically through the middle Hirth interface 172 and having opposite ends centered in the lower Hirth interface 171 and upper Hirth interface 173. Because the first component 150 includes the multiple Hirth interface 170, it may also be referred to as a multiple Hirth component of the adjustable joint 125.

The second component 155, which may also be called a movable body, defines a single Hirth interface 190 having a circular pattern of face teeth 195 sized and shaped to mesh or mate with the face teeth 175 of the lower, middle, and upper Hirth interfaces 171, 172, 173. The second component 155 includes a through-hole 200 centered in the circular pattern of the face teeth 195.

When properly assembled, the single Hirth interface 190 confronts the multiple Hirth interface 170 so the respective face teeth 195, 175 can mate. Because the second component 155 defines a single Hirth interface 190, it may also be referred to as a single Hirth component of the adjustable joint 125. The lower end of the upper arm 120 is rigidly mounted to the second component 155 such that the upper arm 120 rotates and moves linearly with the second component 155.

With additional reference to FIG. 4, the actuator 160 includes a carriage bolt 210 and a handle 215. The carriage bolt 210 includes a threaded end 220, smooth shank 225, a square neck 230, and a bolt head 235. The carriage bolt 210 extends through the slot 180 of the of the first component 150, with the head 235 preventing the carriage bolt 210 from passing completely through the slot 180 and the square neck 230 received in the slot 180 to prevent rotation of the carriage bolt 210 with respect to the slot 180. The threaded end 220 of the carriage bolt 210 extends through the through-hole 200 of the second component 155 and extends beyond an outboard side of the second component 155. The handle 215 is sized and shaped (e.g., as a star knob) to be grasped and rotated manually by the operator. The handle 215 includes a thread hole 240 that threads onto the threaded end 220 of the carriage bolt 210 extending through the outboard side of the second component 155.

Figure 5:
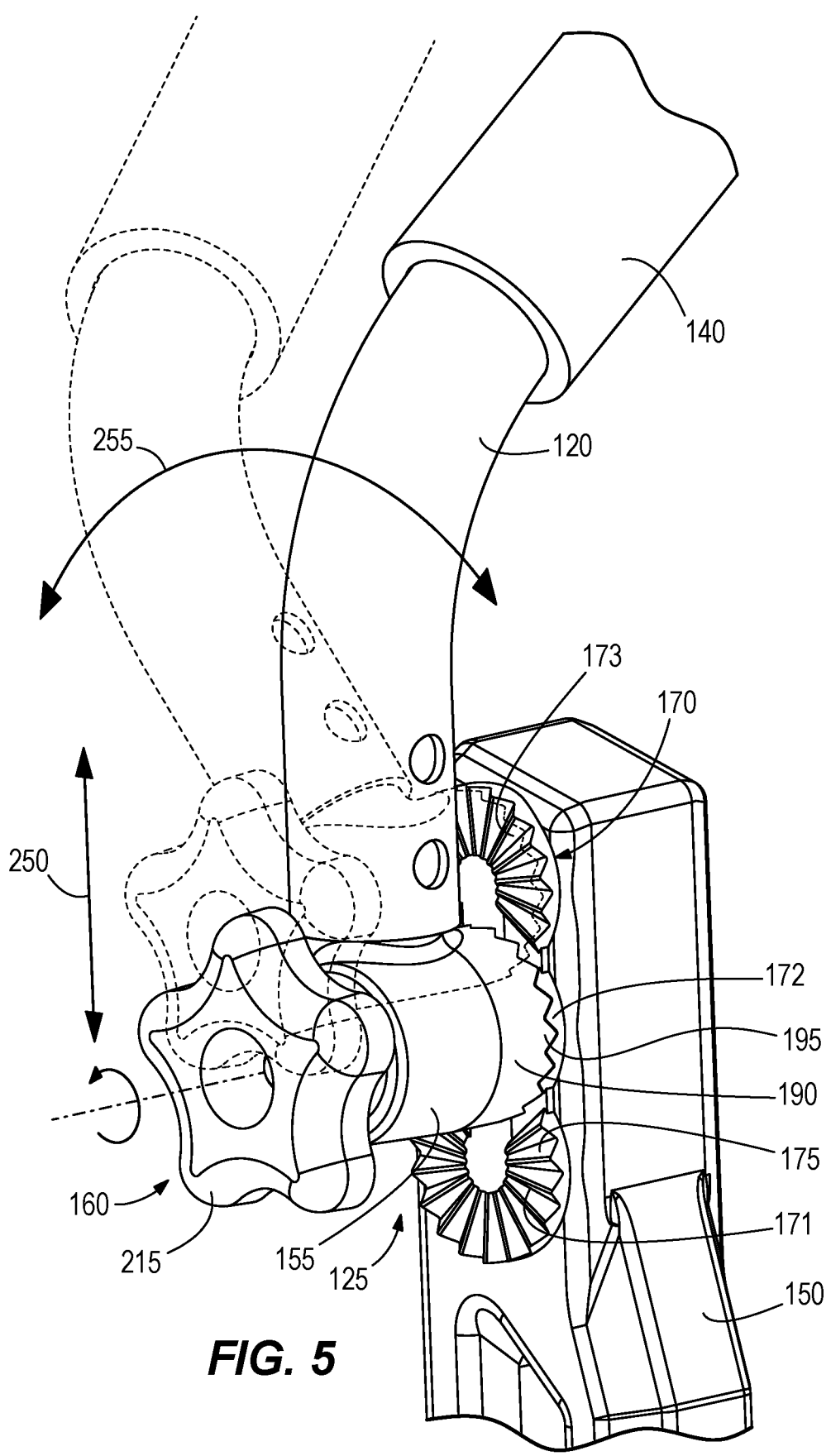
FIG. 5 is a perspective view of the multiple Hirth joint in multiple positions.

With reference to FIG. 5, the adjustable joint 125 permits two degrees of adjustment of the upper arm 120 with respect to the lower arm 115. To adjust the adjustable joint 125, the operator manually loosens the adjustable joint 125 by turning the handle 215 counterclockwise to back the handle 215 away from the second component 155 such that the teeth 195 of the single Hirth interface 190 disengage from the teeth 175 of the multiple Hirth interface 170. The teeth 175, 195 are disengaged when there is axial clearance (i.e., clearance in a direction along the length of the carriage bolt 210) between the teeth 175, 195 so that the second component 155 can be moved linearly and angularly with respect to the first component 150.

With the teeth 175, 195 disengaged, the second component 155 is adjusted linearly 250 and angularly 255 with respect to the first component 150 to set the upper arm 120 in a position that suits the operator sitting in the operator zone 25. Linear adjustment 250, which is up and down in the illustrated embodiment, is accomplished by sliding the carriage bolt 210 in the slot 180. Angular adjustment 255, which is fore and aft in the illustrated embodiment, is accomplished by rotating the upper arm 120 about the axis of the carriage bolt 210. The primary purpose of linear adjustment 250 is to set the height of the grip 140 of the upper arm 120 (i.e., to adjust for the height of the operator) and the primary purpose of angular adjustment 255 is to set the distance of the grip 140 from the operator (i.e., to adjust for the length of the operator's arms). In other words, the adjustable joint 125 is manually adjustable to simultaneously loosen the adjustable joint 125 to permit relative linear 250 an angular 255 movement between the first and second components 150, 155 to linearly 250 and angularly 255 adjust the upper arm 120 into a selected position with respect to the lower arm 115 to accommodate a size of the operator and to simultaneously tighten the adjustable joint 125 to lock the upper arm 120 in the selected position and attitude with respect to the lower arm 115.

Once the desired position of the upper arm 120 is achieved, the operator tightens the adjustable joint 125 by manually rotating the handle 215 clockwise to bring the teeth 175, 195 into engagement. The teeth 195 of the single Hirth interface 190 will mesh with the teeth 175 of the multiple Hirth interface 170 in three linear positions or heights, which are lower, middle, and upper linear positions in which the single Hirth interface 190 meshes with the respective lower, middle, and upper Hirth interfaces 171, 172, 173. Within each of these linear positions the upper arm 120 can be positioned in a number of discrete angular positions equal to the number of teeth 195 in the single Hirth interface 190. The teeth 195 of the single Hirth interface 190 overlap the middle position 172 when the second component 155 is in the lower and upper positions. To prevent crossing teeth, there are no teeth in the multiple Hirth interface 170 in the overlapping zones. This is why the teeth 175 in the lower, middle, and upper Hirth interfaces 171, 172, 173 are arranged in partial circular patterns.

It should be noted that the lower, middle, and upper Hirth interfaces 171, 172, 173 describe circles, each having a center and a diameter equal to a diameter of the single Hirth interface 190. Because the illustrated embodiment employs partial circular patterns of teeth, it can position the centers of the lower, middle, and upper Hirth interfaces 171, 172, 173 less than a diameter's distance from each other. Other embodiments have Hirth interfaces arranged in complete circles of teeth and the centers of Hirth interfaces can be no closer to each other than a diameter (i.e., when adjacent Hirth interface circles are tangent). In other embodiments, a multiple Hirth interface can include more than three Hirth interfaces with wider or narrower spacing between centers to achieve a desired result. The number of Hirth interfaces and the spacing between the Hirth interfaces are selected to meet the desired overall linear adjustment of the upper arm 120 and the number of adjustment settings within the overall linear adjustment.

The adjustable joint 125 therefore provides two degrees of adjustment (linear 250 and angular 255) to the upper arm 120 with respect to the lower arm 115 with a single joint 125. The adjustable joint 125 is considered a single joint because the linear 250 and angular 255 adjustments cannot be independently locked; actuation of the single actuator 160 simultaneously locks both degrees of adjustment 250, 255.

Figure 6:
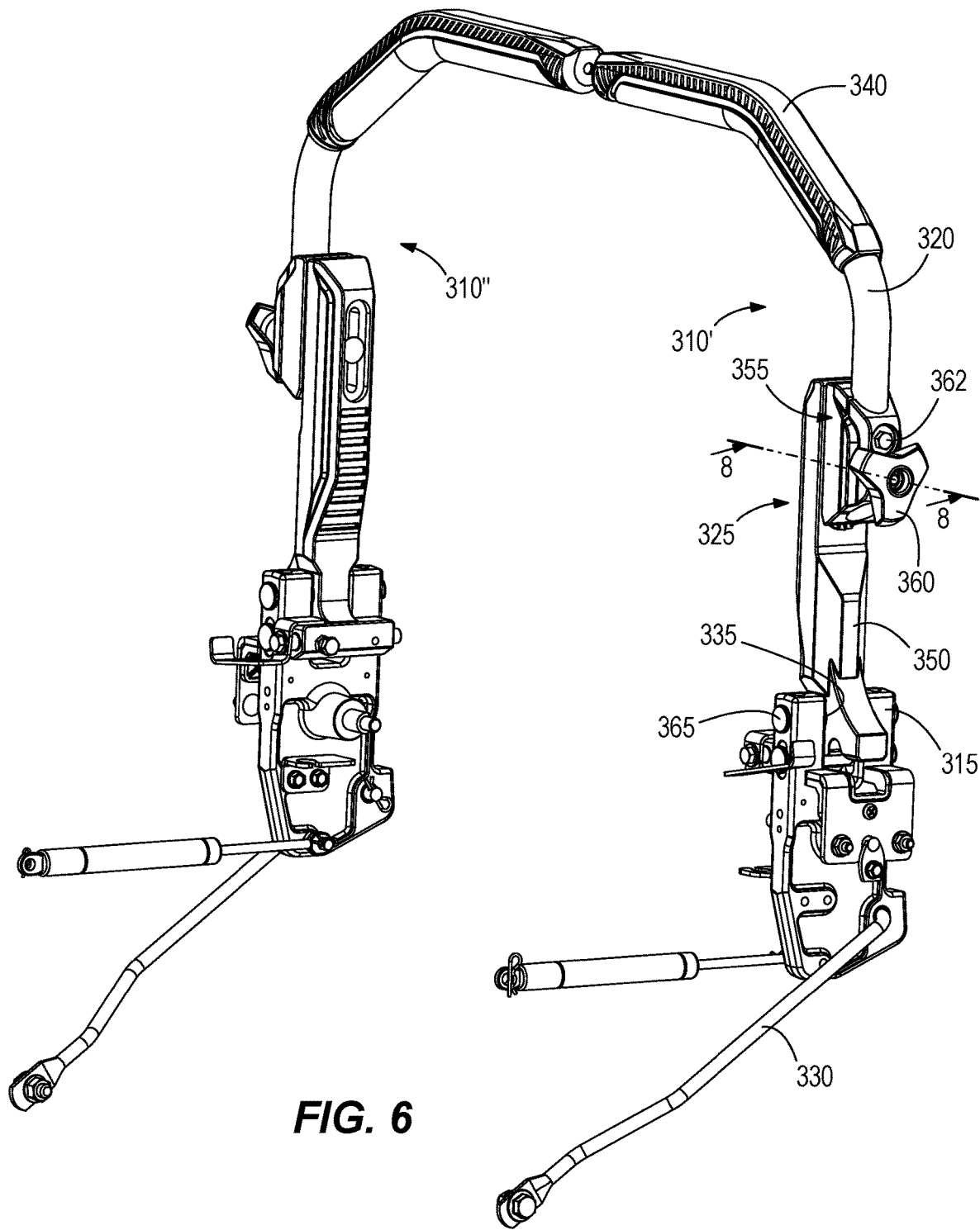
FIG. 6 is a perspective view of two control arms of the lawn mower, each including the multiple Hirth joint according to another embodiment of the disclosure.
Figure 7:
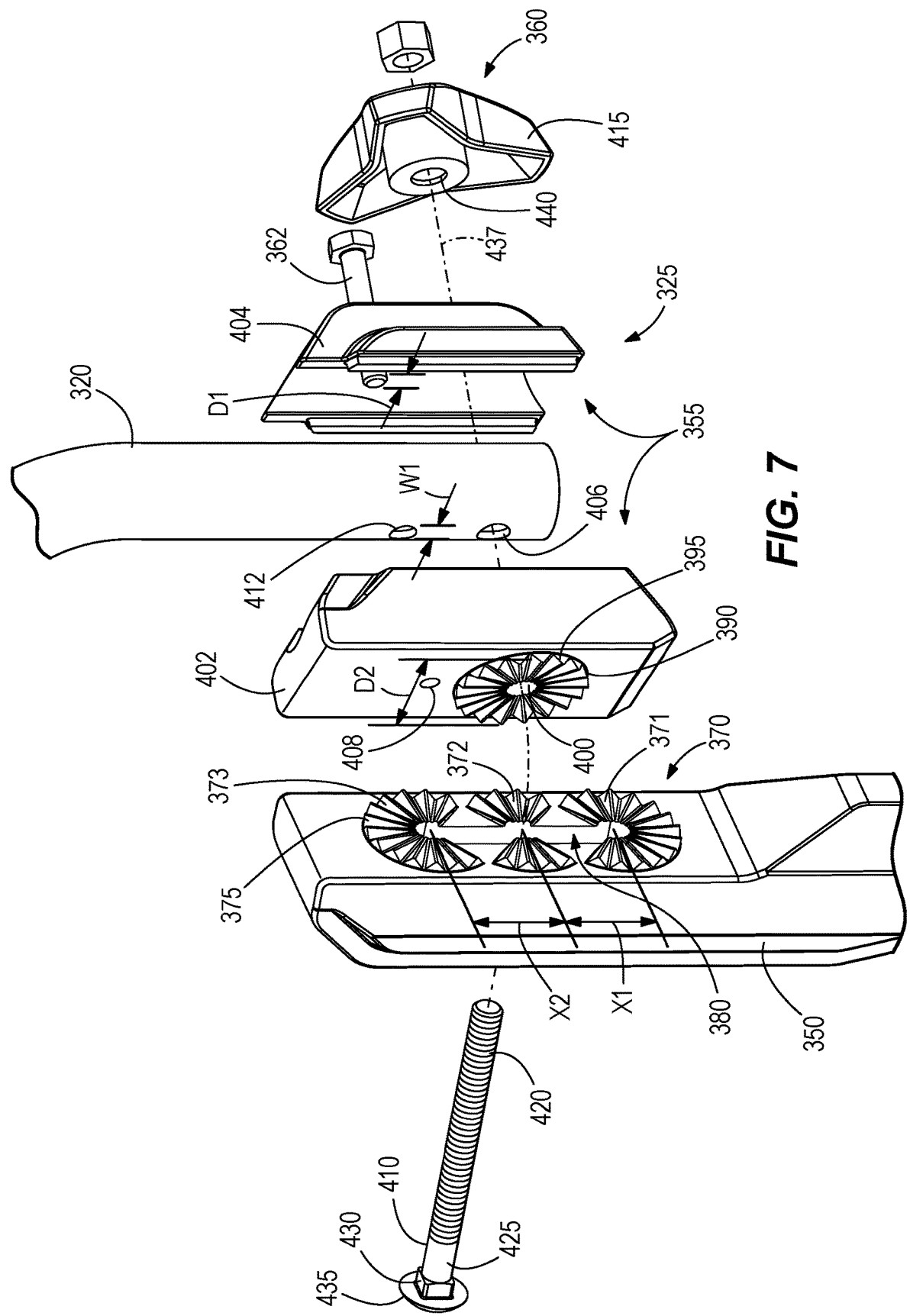
FIG. 7 is an exploded view of a portion of one of the control arms.
Figure 8:
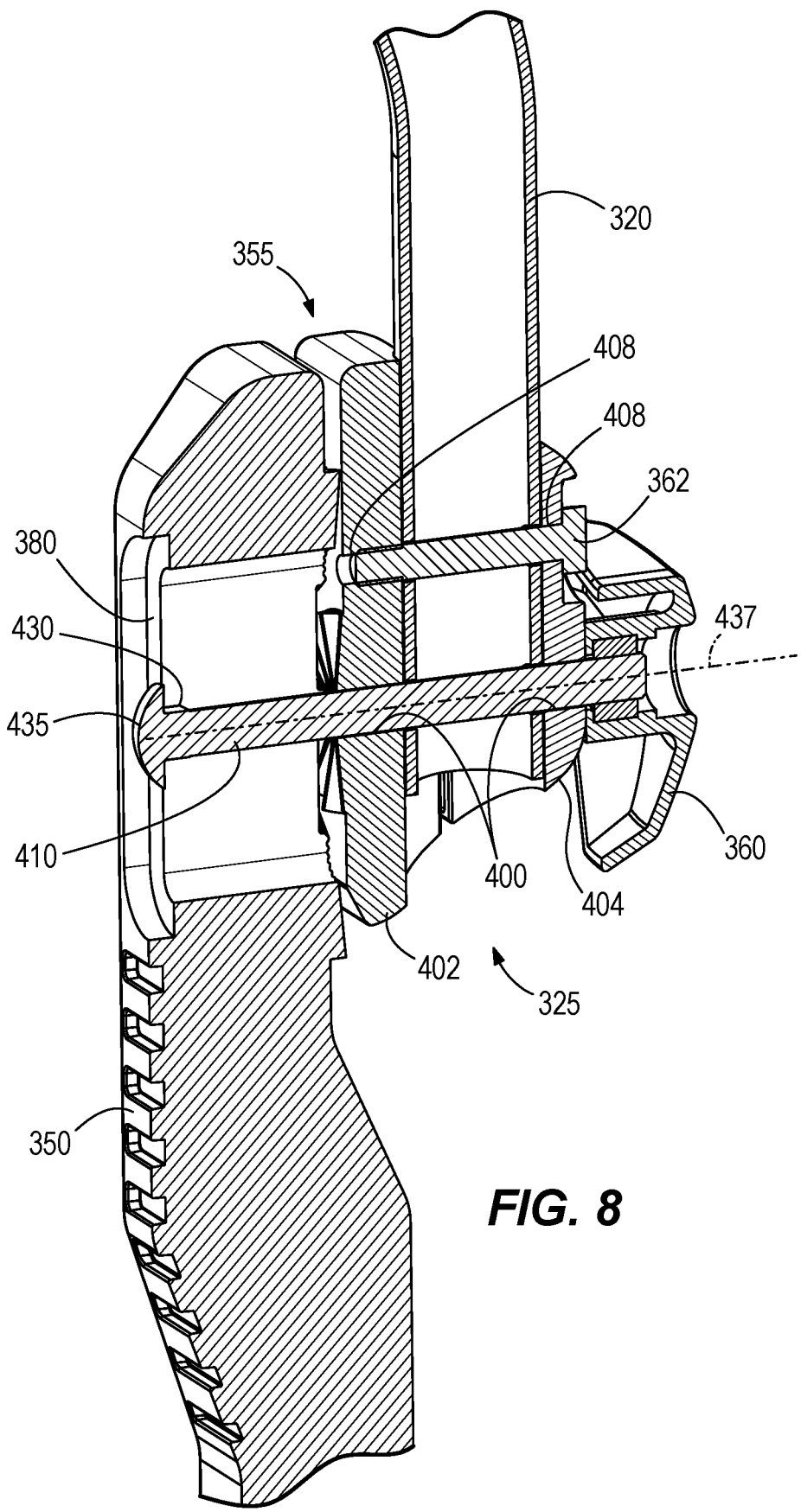
FIG. 8 is a cross-sectional view of a portion of one of the control arms about the line 8-8 in FIG. 6.

FIGS. 6-8 illustrate another embodiment of left and right control arms 310', 310" for the lawn mower 10 with like components and features as the embodiment of the control arms 110', 110" shown in FIGS. 1-5 being labeled with like reference numerals plus "200". The control arms 310', 310" are utilized with a utility vehicle similar to the lawn mower 10 of FIG. 1. The only differences between the control arms 110', 110" of FIGS. 1-5 and the control arms 310', 310" of FIGS. 6-8 are specifically noted herein. In addition, the left and right control arms 310', 310" are mirror images of each other and will be described together with reference to a control arm 310 unless there is a need to distinguish them from each other.

The control arm 310 includes a lower arm 315, upper arm 320, and an adjustable joint 325 connecting the lower arm 315 and upper arm 320. The lower arm 315 pivots fore and aft and includes a linkage 330 to an associated drive motor that operates an associated drive wheel 50. The upper end of the lower arm 315 includes a yoke 335. The upper arm 320 includes a grip 340 that is grasped by the operator to manipulate the control arm 310.

Referring now to FIGS. 6 and 7, the adjustable joint 325 includes a first component 350, a second component 355, an actuator 360, and an alignment fastener 362. The first component 350, which may also be called a main body, is pivotably mounted at its lower end to the yoke 335 of the lower arm 315 with a pivot pin 365 (FIG. 6) for pivoting outboard to provide operator ingress and egress with respect to the operator zone 25 and inboard for operation of the mower 10 with the operator in the operator zone 25. The first component 350 also includes a multiple Hirth interface 370 which includes a lower Hirth interface 371, a middle Hirth interface 372, and an upper Hirth interface 373. Each of the lower, middle, and upper Hirth interfaces 371, 372, 373 includes face teeth 375 arranged in a partial circular pattern. The multiple Hirth interface 370 also includes a slot 380 extending diametrically through the middle Hirth interface 372 and having opposite ends centered in the lower Hirth interface 371 and upper Hirth interface 373. Because the first component 350 includes the multiple Hirth interface 370, it may also be referred to as a multiple Hirth component of the adjustable joint 325.

The second component 355, which may also be called a movable body, defines a single Hirth interface 390 having a circular pattern of face teeth 395 sized and shaped to mesh or mate with the face teeth 375 of the lower, middle, and upper Hirth interfaces 371, 372, 373. In the illustrated embodiment, the second component 355 includes a first housing portion 402 and a second housing portion 404 that define a two-piece clamshell housing. An interior portion of the first and second housing portions 402, 404 are configured to engage with upper arm 320 to selectively secure the second component 355 to the upper arm 320.

Now with reference to FIGS. 7 and 8, the first and second housing portions 402, 404 of the second component 455 each include a first through-hole 400 centered in the circular pattern of face teeth 395. A first aperture 406 (FIG. 7) is formed in the upper arm 320 and is configured to be aligned with the first through-hole 400. In the illustrated embodiment, the circular pattern of face teeth 395 is formed on a surface of the first housing portion 402 that faces away from the upper arm 320 and toward the first component 350.

The actuator 360 includes a carriage bolt 410 and a handle 415. The carriage bolt 410 includes a threaded end 420, smooth shank 425, a square neck 430, and a bolt head 435. The carriage bolt 410 extends through the slot 380 of the of the first component 350 and the aligned first aperture 406 and first through-hole 400, along an actuator axis 437. The head 435 prevents the carriage bolt 410 from passing completely through the slot 380 and the square neck 430 received in the slot 380 to prevent rotation of the carriage bolt 410 with respect to the slot 380. The actuator axis 437 may align with the center of one of the lower, middle, and upper Hirth interfaces 371, 372, 373 depending on the position of the upper arm 320. The threaded end 420 of the carriage bolt 410 extends through the first through-hole 400 of the second component 355 and extends beyond an outboard side of the second component 355. The handle 415 is sized and shaped (e.g., as a star knob) to be grasped and rotated manually by the operator. The handle 415 includes a thread hole 440 that threads onto the threaded end 420 of the carriage bolt 410 extending through the outboard side of the second component 355.

The first and second housing portions 402, 404 of the second component 355 further include a second through-hole 408 vertically offset the first through-hole 400. A second aperture 412 (FIG. 7) is formed in the upper arm 320 vertically offset the first aperture 406. The second aperture 412 is configured to receive the alignment fastener 362 to secure the second component 355 to the upper arm 320. The second aperture 212 is oversized to allow adjustment of the upper arm 320 relative to the second component 355.

The term "oversized" as applied to the second aperture 412 is defined as an aperture that permits a pivotable degree of freedom (e.g., in a fore or aft direction) of the upper arm 320 about the actuator axis 437. In the illustrated embodiment, a width W1 of the second aperture 412 (e.g., in the fore and aft direction) is greater than the diameter D1 of the alignment fastener 362, such that the second aperture 412 is elongated in the fore and aft direction. In other embodiments, the second aperture 412 may include a diameter that is greater than the diameter D1 of the alignment fastener 362. The oversized construction of the second aperture 412 allows adjustment of the upper arm 320 relative the first and second housing portions 402, 404 of the second component in the fore and aft direction. In the illustrated embodiment, the oversized construction of the second aperture 412 allows for the upper arm 320 to be adjusted up to 10 degrees in a fore or aft direction to position the upper arm 320 in a desired neutral or resting position. In this regard, the oversized second aperture 412 provides fine adjustment of the fore and aft positioning of the upper arm 320 between the settings permitted by engagement of the face teeth 375, 395.

When properly assembled, the single Hirth interface 390 confronts the multiple Hirth interface 370 so the respective face teeth 395, 375 can mate. Because the second component 355 defines a single Hirth interface 390, it may also be referred to as a single Hirth component of the adjustable joint 325. In the illustrated embodiment, the second component 355 is removably attached to the upper arm 320. When the second component 355 is coupled to the upper arm 320, the lower end of the upper arm 320 is rigidly mounted to the second component 355 such that the upper arm 320 rotates and moves linearly with the second component 355. In other embodiments, the second component 355 may be integrally formed with the upper arm 320.

The slot 380 allows for linear movement (e.g., up or down) of the upper arm 320 from a first linear position (e.g., neutral position) to a second linear position or a third linear position. In the neutral linear position, the single Hirth interface 390 is aligned with the middle Hirth interface 372 (e.g., a middle portion of the slot 380). In the second linear position, the single Hirth interface 390 is aligned with the lower Hirth interface 371 (e.g., a lower end of the slot 380). In the third linear position, the single Hirth interface 390 aligns the upper Hirth interface 373 (e.g., an upper end of the slot 380). In the illustrated embodiment, the upper arm 320 may travel approximately one inch when the upper arm 320 is moved from the first linear position to the second linear position or the third linear position. In other words, a first distance X1 between the center of the middle Hirth interface 372 (e.g., the middle portion of the slot) and the center of the lower Hirth interface 371 (e.g., the lower end of the slot 380) is approximately one inch. A second distance X2 between the center of the middle Hirth interface 372 and the center of the upper Hirth interface 373 (e.g., the upper end of the slot 380) is also approximately one inch. In addition, the face teeth 395 of the Hirth joint has a diameter D2 of approximately 1.5 inches. The construction of the multiple Hirth interface 370 allows for an increased diameter of the single Hirth interface 390 to increase the strength of the Hirth joint, while allowing a desired range of linear movement of the upper arm 320. In particular, the first and second distance X1, X2 from the first linear position is less than the diameter D2 of the single Hirth interface 390. In other words, the diameter D2 of the face teeth 395 is greater than the first and second distance X1, X2. In some embodiments, the diameter D2 is in a range from 1.25 to 2 times the distance X1, X2.

Similar to the adjustable joint 125 illustrated in FIG. 5, the adjustable joint 325 permits two degrees of adjustment of the upper arm 320 with respect to the lower arm 315. For the sake of brevity, it should be appreciated that the adjustable joint 325 may be adjusted in a similar manner as the adjustable joint 125, which is described in detail above, but with additionally fine adjustment in the fore and aft directions afforded by the oversized second aperture 412.

The foregoing is a description of two embodiments of the invention and is not limiting. The invention may be embodied in any outdoor power equipment or other application in which it is desired to provide linear and angular adjustment of one component with respect to another component in a single joint. Also, as one of ordinary skill in the art will appreciate, the components of the disclosed embodiments can be reversed and interchanged such that, for example, another embodiment of the invention can have the multiple Hirth interface 170 or 370 on the second component 155 or 355 which is rigidly attached to the upper arm 120 or 320 while the single Hirth interface 190 or 390 is on the first component 150 or 350 which is coupled to the lower arm 115 or 315.

Thus, the invention is to cover all modifications, equivalents, and alternatives falling within the spirit and scope of the invention as defined by the following claims.

What is claimed is:

1. A utility vehicle comprising:
    a frame;
    an operator zone for an operator of the utility vehicle during operation;
    a control handle including a lower arm and an upper arm; and
    an adjustable joint between the lower arm and upper arm, the adjustable joint including a first component having a multiple Hirth joint interface and a slot, a second component having a single Hirth joint interface, and an actuator;
    wherein the actuator is manually adjustable to simultaneously loosen the adjustable joint to permit relative linear movement along the slot between the first and second components and relative angular movement between the first and second components, such relative linear and angular movement adjusting the upper arm into a selected position with respect to the lower arm to accommodate a size of the operator, and
    wherein the actuator is manually adjustable to simultaneously tighten the adjustable joint to lock the upper arm in the selected position with respect to the lower arm.

2. The utility vehicle of claim 1, wherein the multiple Hirth joint interface includes lower, middle, and upper sets of face teeth that mesh with face teeth on the single Hirth joint interface.

3. The utility vehicle of claim 2, wherein the slot extends diametrically across the middle set of face teeth and includes an upper end centered in the upper set of face teeth, a lower end centered in the lower set of face teeth, and a middle portion centered in the middle face teeth.

4. The utility vehicle of claim 3, wherein a first distance is defined between the middle portion and the upper end of the slot and a second distance is defined between the middle portion and the lower end of the slot, wherein the first and second distances define a linear range of the upper arm, and wherein the single Hirth joint interface has a diameter that is larger than the first distance and the second distance.

5. The utility vehicle of claim 4, wherein the diameter is in a range from 1.25 to 2 times the first distance or the second distance.

6. The utility vehicle of claim 1, wherein the actuator includes a fastener movable along the slot, loosening the adjustable joint includes moving the first and second components away from each other along the fastener, and tightening the adjustable joint includes moving the first and second components toward each other along the fastener.

7. The utility vehicle of claim 1, wherein the second component includes a first housing portion and a second housing portion removably coupled to the upper arm.

8. The utility vehicle of claim 1, wherein a first through-hole is formed in the second component and is centered in the single Hirth interface, and wherein a first aperture is formed in the upper arm and is configured to be aligned with the first through-hole to receive the actuator.

9. The utility vehicle of claim 8, wherein a second through-hole is formed in the second component vertically offset the first through-hole, wherein a second aperture is formed in the upper arm vertically offset the first aperture, and wherein an alignment fastener is configured to extend through the second through-hole and the second aperture to secure the second component to the upper arm.

10. The utility vehicle of claim 8, wherein a second aperture is oversized so the upper arm can be adjusted relative to the second component in the fore and aft direction.

11. A control handle for a utility vehicle, the control handle comprising:
    a lower arm,
    an upper arm, and
    an adjustable joint between the lower arm and upper arm, the adjustable joint including
        a first component having a multiple Hirth joint interface and a slot,
        a second component having a single Hirth joint interface, and
        an actuator configured to be manually adjustable to simultaneously loosen the adjustable joint to permit relative linear movement along the slot between the first and second components and relative angular movement between the first and second components, such relative linear and angular movement adjusting the upper arm into a selected position with respect to the lower arm to accommodate a size of the operator;
    wherein the actuator is configured to be manually adjustable to simultaneously tighten the adjustable joint to lock the upper arm in the selected position with respect to the lower arm.

12. The control handle of claim 11, wherein the multiple Hirth joint interface includes lower, middle, and upper sets of face teeth that mesh with face teeth on the single Hirth joint interface.

13. The control handle of claim 12, wherein the slot extends diametrically across the middle set of face teeth and includes an upper end centered in the upper set of face teeth, a lower end centered in the lower set of face teeth, and a middle portion centered in the middle face teeth.

14. The control handle of claim 11, wherein the actuator includes a fastener movable along the slot, loosening the adjustable joint includes moving the first and second components away from each other along the fastener, and tightening the adjustable joint includes moving the first and second components toward each other along the fastener.

15. The control handle of claim 11, wherein the second component includes a first housing portion and a second housing portion removably coupled to the upper arm.

16. The control handle of claim 11, wherein a first through-hole is formed in the second component and is centered in the single Hirth interface, and wherein a first aperture is formed in the upper arm and is configured to be aligned with the first through-hole to receive the actuator.

17. The control handle of claim 16, wherein a second through-hole is formed in the second component vertically offset the first through-hole, wherein a second aperture is formed in the upper arm offset the first aperture, and wherein an alignment fastener is configured to extend through the second through-hole and the second aperture to secure the second component to the upper arm.

18. The control handle of claim 17, wherein a second aperture is elongated in a fore and aft direction so the upper arm can be adjusted relative to the second component in the fore and aft direction.

19. A utility vehicle comprising:
a frame;
an operator zone for an operator of the utility vehicle during operation;
a control handle including a lower arm and an upper arm; and
an adjustable joint between the lower arm and upper arm, the adjustable joint including
a first component having a first Hirth joint interface, a second Hirth joint interface, and a slot extending from a first Hirth joint center to a second Hirth joint center, wherein the first Hirth joint center and the second Hirth joint center are separated by a first distance,
a second component having a single Hirth joint interface, the single Hirth joint having a diameter, and
an actuator configured to selectively permit or lock relative linear movement along the slot between the first and second components and relative angular movement between the first and second components, wherein the diameter of the single Hirth joint is greater than the first distance between the first Hirth joint center and the second Hirth joint center.

20. The utility vehicle of claim 19, wherein the first component includes a third Hirth joint interface having a third Hirth joint center, wherein the second Hirth joint interface is positioned between the first and third Hirth joint interfaces, and wherein the third Hirth joint center and the second Hirth joint center are separated by a second distance that is equal to the first distance, and wherein the first, second, and third Hirth joint interfaces each include face teeth that mesh with face teeth on the single Hirth joint interface.

21. The utility vehicle of claim 19, wherein the actuator includes a fastener movable along the slot, loosening the adjustable joint includes moving the first and second components away from each other along the fastener, and tightening the adjustable joint includes moving the first and second components toward each other along the fastener.

* * * * *